United States Patent [19]

Spindel et al.

[11] 3,928,840

[45] Dec. 23, 1975

[54] TRACKING SYSTEM FOR UNDERWATER OBJECTS

[75] Inventors: Robert C. Spindel, North Falmouth; Robert P. Porter, Falmouth, both of Mass.

[73] Assignee: The United States of America as represented by the Secretary of the Navy, Washington, D.C.

[22] Filed: Apr. 19, 1974

[21] Appl. No.: 462,557

[52] U.S. Cl.................. 340/6 R; 340/3 D; 340/5 R
[51] Int. Cl.² .......................................... G01S 5/18
[58] Field of Search..................... 340/3 D, 5 R, 6 R

[56] References Cited
UNITED STATES PATENTS
3,421,138   1/1969   Moulin et al......................... 340/5 R Primary Examiner—Richard A. Farley
Attorney, Agent, or Firm—R. S. Sciascia; L. I. Shrago

[57] ABSTRACT

A system for tracking with high precision the movement of an underwater object having a sound detecting capability employs three bottom-moored acoustic signal sources which are generally disposed in a triangular pattern and continuously radiate acoustic signals which are clustered, for example, about 12 kc. The composite signal that is detected is processed so that each radiated signal is subsequently transformed into a pair of quadraturely phased signals which are proportional to the sine and cosine of the input phase angle. These signals are converted to digital form and, thereafter, supplied to a digital computer which determines the inverse tangent of the ratio of these pair of signals. The phase of each signal so determined may be utilized, for example, to ascertain the slant range changes of the object with respect to a three-dimensional coordinate system.

8 Claims, 2 Drawing Figures

TRACKING SYSTEM FOR UNDERWATER OBJECTS

The present invention relates generally to apparatus for and methods of tracking the motion of a submerged sound-detecting object with an extremely high degree of accuracy and, more particularly, to a continuous-wave, doppler-tracking underwater navigation system which is capable of providing positional fixes on such an object at a comparatively high data rate.

The customary method utilized to locate and track the movement of an underwater device that may possess a sound detecting capability involves measuring the travel time of acoustic pulses which may, for example, be emitted periodically from stationary underwater acoustic sources. Underwater beacons which emit pulses at a precisely controlled rate or transponders which emit these pulses when interrogated are typical of the sources utilized in these systems. The procedure employed essentially involves multiplying the travel times of the acoustic pulses by the velocity of sound in the particular water environment encountered to determine the slant ranges from the stationary sources to the movable object.

Slant ranges from a minimum of three units may be converted to a coordinate system to yield the position of the submerged object. However, both beacon and transponder pulse systems have two main disadvantages which limit their accuracy. First, the maximum rate of data acquisition is limited by the system range ambiguity. For example, for a slant range $R_s$ and sound velocity $c$, the maximum pulse repetition rate is $R_s/c$ pulses per second. Because of this, a navigation fix can only be made once each $R_s/c$ second. When the slant ranges involved are of the order of several kilometers, this rate may be as low as one fix every several seconds. Second, the bandwidth of the acoustic pulse limits the precision of the arrival time measurement. In a typical 9 to 13 kHz pulse system, minimum time resolution may, therefore, be on the order of 1 msec., which corresponds to a slant range resolution of approximately 1.5 meters.

It is, accordingly, a primary object of the present invention to provide an extremely accurate arrangement for tracking the motion of a submerged object which has a sound detecting capability.

Another object of the present invention is to provide an underwater tracking system which is capable of providing tracking data at a relatively high data rate.

Another object of the present invention is to provide a continuous-wave, doppler-tracking underwater navigation system which can detect changes in the movement of an object which are of the order of several cms.

A still further object of the present invention is to provide a system for obtaining highly accurate mooring motion.

Other objects, advantages and novel features of the invention will become apparent from the following detailed description of the invention when considered in conjunction with the accompanying drawings wherein.

Briefly, and in somewhat general terms, the above objects of invention are accomplished by employing three or more bottom-moored beacons with each beacon transmitting a highly stable, crystal-controlled continuous acoustical signal. The operating frequencies of the various beacons are clustered about a particular frequency, which in the example hereinafter described, is 12 kHz. Each beacon transmits a different frequency with the separation between adjacent frequencies being an integral multiple of a particular audio-frequency.

The beacon transmissions are continuously received by a submerged hydrophone whose position and motion are being determined. The composite signals so detected are appropriately separated and processed such that phase changes in each of the radiated signals of at least one-fourth cycle are measured. These phase changes provide the overall system with a resolution of 3 cms or more for a 12 kHz beacon frequency. This motion, of course, is relative to the fixed beacon triangle, and the locations of these beacons may be determined by a satellite system or by ship navigation.

Figure 1:
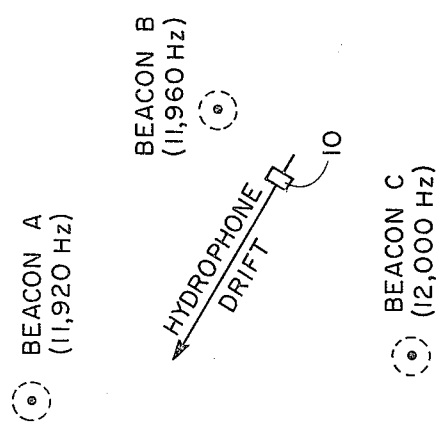
FIG. 1 illustrates a typical beacon deployment geometry.

Referring now to FIG. 1 of the drawings, there is shown a typical beacon deployment geometry where the three bottom-moored beacons A, B and C are positioned to form a fixed nearly equilateral triangle with 8 km legs. The errors associated with the location of these beacons are shown as dotted circles. Each of these beacons contains a crystal oscillator with a frequency stability of ±0.001 Hz or better in thermal equilibrium at 2° C. Beacon A emits an acoustic signal of 11920 Hz; beacon B a signal of 11960 Hz; and beacon C a signal of 12,000 Hz. Consequently, there is a 40 Hz difference between beacons A and B and beacons B and C.

Figure 2:
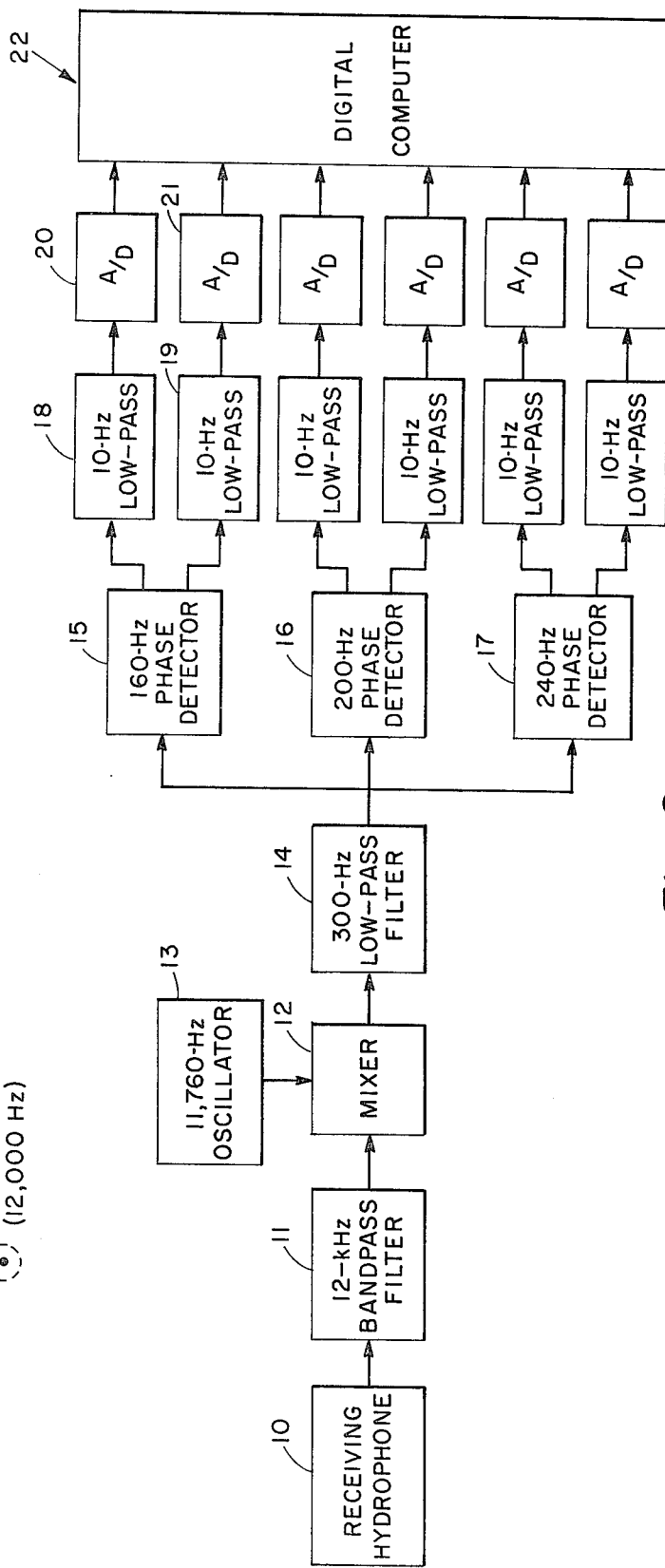
FIG. 2 is a box diagram of the signal processing system associated with the sound detecting device for determining the motion of the underwater object.

A submerged hydrophone 10, whose position is to be determined, is shown located within the area of the triangle and drifting in the general direction of the arrow. The beacon signals are all detected by this hydrophone, and, as shown in FIG. 2, the resultant composite signal is bandpass filtered in an 11 to 13 kHz filter 11. Thereafter, the signal is heterodyned in mixer 12 with a local oscillator operating at 11760 Hz. The intermediate-frequency signals resulting therefrom, which are in the range of 0 to 300 Hz, are low-pass filtered by filter 14 having this bandpass. The output of this filter is thereafter simultaneously applied to three phase detectors or complex demodulators 15, 16 and 17. These detectors are tuned to 160 Hz, 200 Hz and 240 Hz, respectively. Consequently, each beacon signal is processed by a separate phase detector, that is, detector 15 processes the signal radiated from beacon A; detector 16 the signal from beacon B; and detector 17 the signal from beacon C. Each of these phase detectors provide two baseband outputs, one proportional to the sine of the input phase angle, the other proportional to the cosine of this input phase angle.

Phase variations due to a finite receiver velocity can be written as $$\theta(t) = 2\pi f_B v(t)/c \qquad (1)$$

where $f_B$ is the beacon frequency, $c$ is the speed of sound in water, $v(t)$ is the receiver velocity and $t$ is time. Thus, if the input signal is represented by $$s(t) = A(t)\exp\{-j[2\pi f_B t - \theta(t)]\} \qquad (2)$$

the phase-detector outputs are given by $$p1(t) = A(t)\cos\theta(t) \qquad (3)$$

and $$p2(t) = A(t)\sin\theta(t) \qquad (4)$$

The ratio $p2(t)/p1(t) = \tan\theta(t)$ allows determination of $\theta(t)$, the instantaneous phase of the beacon signal. A phase change of $\theta$ cycles corresponds to a change in slant range of $\lambda\theta$, where $\lambda$ is the wavelength of the beacon frequency. Three beacons, therefore, allow decomposition of slant range changes measured in this manner into a suitable three dimensional system.

In the present case, the quadrature components from each phase detector are, in turn, subjected to low pass filtering 0 to 10 Hz, by filters 18 and 19, for example. After this filtering, the outputs are converted from analog-to-digital form by analog-to-digital converters 20 and 21. The digital signals are, thereafter, processed in a digital computer which is programmed to determine the phase of the beacon signal by forming the ratio of the quadrature components and taking the inverse tangent thereof.

In another computation scheme, the computer determines the $\pm$ sign of the low pass filter outputs, 18 and 19, which in turn defines the quadrant $0° - 90°$, $90° - 180°$ etc. of the beacon frequency. The program simply counts and accumulates the number of quadrants the detected signal, 18 and 19, has passed through. Each quadrant is a change in the slant range to the beacon of one-quarter wavelength.

The velocity of the hydrophone during an interval ($t_1$, $t_2$) may be expressed as $$v = [\theta(t_1)-\theta(t_2)]c/2\pi fB(t_2-t_1) \quad (5)$$

and its displacement during the same interval may be expressed as $$d = |\theta(t_2)-\theta(t_1)|c/2\pi fB \quad (6)$$

In principle, the accuracy of the above technique is limited only by the acoustic wavelength of the beacon transmission. At 12 kHz, this wavelength is approximately 12.5 cms, and since phase changes of at least one-fourth cycles can be measured easily, the system possesses a resolution of 3 cms or more.

In the system above described, position information is available at a rate limited only by the analog-to-digital conversion rate selected. In one typical embodiment, a rate of 40 Hz was used and, therefore, fixes were available 40 times a second.

Another advantage of the above method is that the total bandwidth occupied by the navigation information was on the order of 80 Hz for the three-beacon systems disclosed. In contradistinction, a pulse system typically occupies several kHz of bandwidth. It would be pointed out that the beacon frequencies need not be clustered about the 12 kHz value selected but may be chosen depending upon the requirements of increased resolution and decreased range. It should, of course, be recognized that higher frequencies yield shorter wavelengths and, thus, greater resolution, but the increased attenuation at these high frequencies limits the total range. It would also be pointed out that there is no real requirement for the mixing operation in the system of FIG. 2 to obtain an intermediate frequency since the composite beacon-frequency signal, after appropriate filtering, can be applied directly to the phase detectors.

As noted above, a single beacon and an associated phase detector can provide velocity and displacement information only along the beacon hydrophone vector. The three spatially separated beacons allow decomposition of the hydrophone motion along the beacon-hydrophone propagation vectors into a rectangular coordinate system. Thus, a hydrophone motion in any arbitrary direction can be computed. If it is necessary to describe this motion with respect to an absolute frame of reference, then the location of the beacons must be determined accurately.

In one particular application, it was necessary to locate the beacons to an accuracy of 300 meters at a depth of 5,000 meters. Two methods of surveying was used to achieve this precision. Both methods employed a 12 kHz hull-mounted transducer as the receiving hydrophone.

In the first method, phase differences between successive phase detector samples were computed and accumulated. The accumulated phase after T seconds consists of differences of the form $$O_T = \sum_{n=1}^{N} [O(t_n)-O(t_{n-1})], \quad N = Tf_s \quad (7)$$

where $f_s$ is the sampling frequency of the phase-detected outputs. The accumulated phase is displayed once per minute. When the receiver approaches the fixed beacon, the accumulated phase will decrease; when leaving, it increases. Thus, the time at which the perpendicular from the ship's track to the beacon is crossed can be ascertained to within one minute. The beacon is located at the crossing of two such perpendiculars. Two satellite fixes along each track and a constant heading are the only prerequisites for successfully implementing this technique.

The second beacon survey technique requires only three satellite fixes to survey all beacons. The accumulated phase between two fixes is measured and compared with a calculated phase shift based on an assumed beacon location. The difference between the measured shift and the calculated shift is treated as an error difference and an iterative computer program is used to adjust the assumed location until the error reaches a minimum. It should be noted in connection with the above techniques that the average sound velocity along the transmission path should be calculated to an accuracy of $\pm 1$ m per second. This accuracy can be achieved by lowering appropriate salinity, density and temperature measuring apparatus.

In actual practice, it is usually necessary to suspend the beacons several meters above the bottom to allow for the attachment of recovery-release devices or to prevent sinking of the beacon into soft sediments. The most common geometry has the receiver somewhere in the water column and not on the surface. It can be shown that multi-path interference produced by either bottom or surface reflections will be negligible if the ratio $h/r$ is much less than 1 where $r$ is the slant range from the beacon to the sound receiver and $h$ represents either the height of the beacon above the bottom or the depth of the receiver below the surface.

The above system, as indicated hereinbefore, may be utilized to track the motion of either a ship suspended hydrophone, a ship mounted hydrophone or a sonobuoy deployed hydrophone. It may also be used in any environment where highly accurate mooring motion must be obtained. It also provides a technique for navigating a ship to a surface package containing a beacon for recovery purposes.

What is claimed is:

1. In a system for tracking the movement of an underwater object, the combination of first, second and third sound sources moored to the bottom of the ocean in a generally triangular pattern, said first, second and third sound sources continuously radiating acoustic signals of frequencies $f_1$, $f_2$ and $f_3$, respectively, means for detecting the composite signal arriving at said object;

means for processing said composite signal so as to produce first, second and third pairs of quadraturely phased signals which are proportional to the sine and cosine of the input phase angles of said signals $f_1$, $f_2$ and $f_3$;

means for converting said pairs of signals to digital signals at a pre-selected data rate; and computer means for processing said digital signals so as to determine the inverse tangent of the input phase angles and therefrom the instantaneous phases of signals $f_1$, $f_2$ and $f_3$ at said object, said phases corresponding to changes in the slant range from said object to said sound sources as determined by the wavelengths of $f_1$, $f_2$ and $f_3$.

2. In an arrangement as defined in claim 1 wherein the differences between $f_1$ and $f_2$ and $f_2$ and $f_3$ are equal and correspond to an integral multiple of a particular audio-frequency.

3. In an arrangement as defined in claim 1 wherein means for processing said composite signal includes means for heterodyning said composite signal in a mixer with a local oscillator whose frequency is spaced from $f_2$ by an amount such that the intermediate frequency signals resulting therefrom are in a low audio-frequency range.

4. In an arrangement as defined in claim 1 wherein said means for processing said composite signal so as to produce said first, second and third pairs of quadraturely phased signals further includes means for heterodyning said composite signal with a locally generated signal so as to produce intermediate frequency signals;

first, second and third phase detectors, each of said phase detectors being tuned to a different one of the three intermediate frequency signals produced by said heterodyning action; and means for feeding said intermediate frequency signals to the inputs of said first, second and third phase detectors whereby said first, second and third pairs of quadraturely phased signals are produced in the different output circuits thereof.

5. In a system for tracking an object that is moving within the ocean, the combination of first, second and third acoustic sources moored to the bottom of the ocean in a generally triangular geometry, said first, second and third acoustic sources continuously radiating acoustic signals of frequencies $f_1$, $f_2$ and $f_3$, respectively, which are within the audio portion of the spectrum;

means for detecting the composite signal arriving at said object;

means for processing said composite signal so as to produce first, second and third pairs of quadraturely phased signals which are proportional to the sine and cosine of the input phase angles of said signals $f_1$, $f_2$ and $f_3$ at said object;

means for transforming said pairs of signals into corresponding digital signals at a pre-selected data rate; and computer means for processing said digital signals so as to determine the sign associated with the ratio of each pair of signals, and for counting the number of changes of signs that occur during a given time interval, each change in sign corresponding to a change in the slant distance to said sources equal to one-fourth wavelength of the corresponding signals $f_1$, $f_2$ and $f_3$.

6. In an arrangement as defined in claim 5 wherein the frequency differences between $f_1$ and $f_2$ and $f_2$ and $f_3$ are equal.

7. In an arrangement as defined in claim 5 wherein said means for processing said composite signal includes means for heterodyning said composite signals with an audio-frequency so as to produce intermediate frequency signals in a low part of the audio-frequency range.

8. In an arrangement as defined in claim 7 wherein said means for processing said composite signal further includes a low pass filter adapted to pass frequencies up to and including that of the highest intermediate frequency signal produced by said heterodyning action;

means for feeding said intermediate frequency signals to the input of said low pass filter;

first, second and third phase detectors, each of said phase detectors being tuned to a different one of the three intermediate frequency signals resulting from said heterodyning action; and means for feeding the output of said low pass filter to the inputs of said phase detectors whereby said first, second and third pairs of quadraturely phased signals are produced in the different output circuits thereof.

* * * * *